Patented Mar. 5, 1935

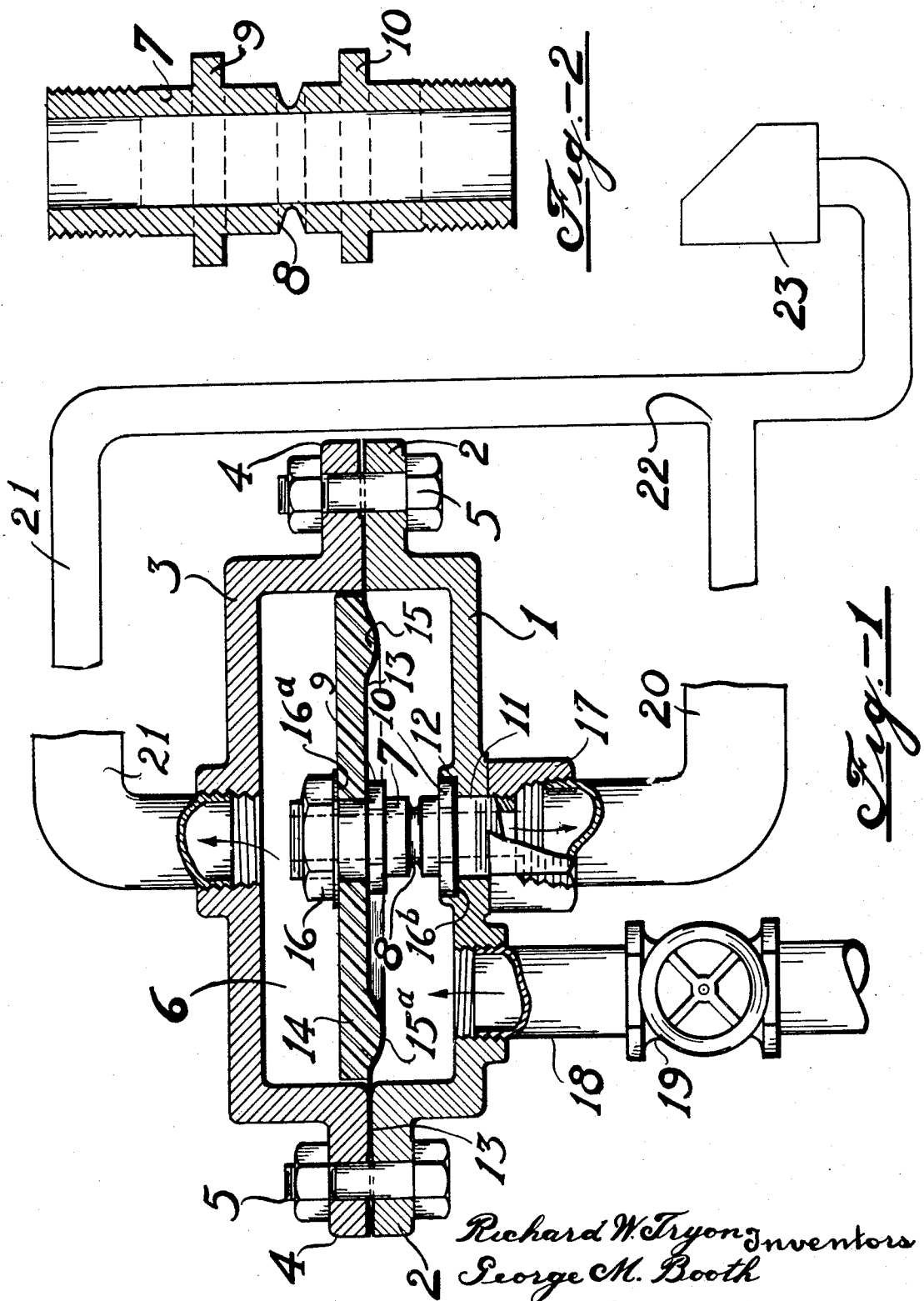

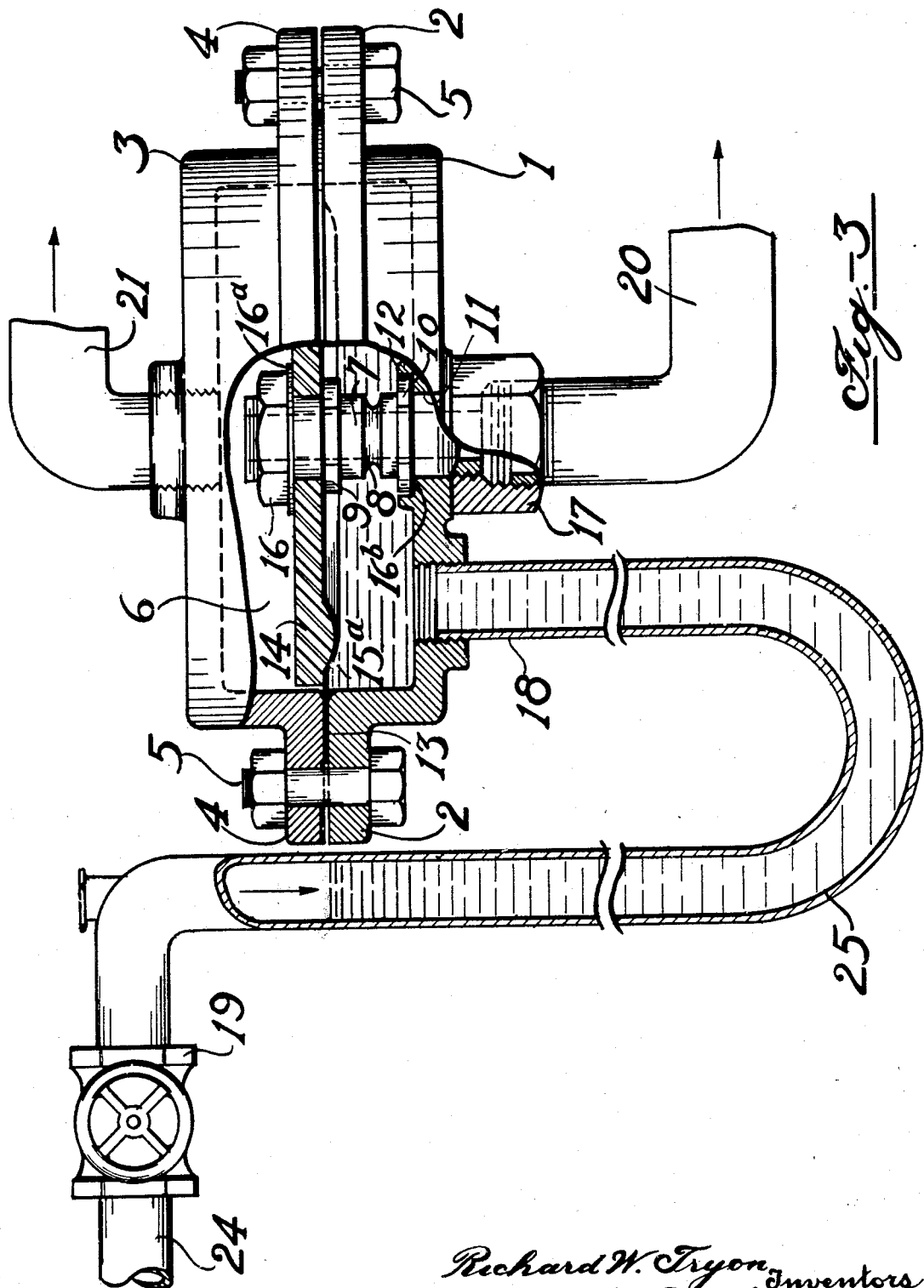

1,993,301

UNITED STATES PATENT OFFICE 1,993,301

FRANGIBLE SAFETY DEVICE

Richard W. Tryon and George M. Booth, Elizabeth, N. J., assignors to Standard Oil Development Company, a corporation of Delaware Application November 25, 1930, Serial No. 498,098

11 Claims. (Cl. 220—89)

This invention relates to improvements in automatic release devices of the frangible type for containers which may be subjected to excessive pressure. The principal object of the invention is to provide a release device in which the frangible element is adapted to yield on direct tension. This is applied by pressure acting on a member of large cross-sectional area carried by the frangible element. Other objects of the invention are to minimize the danger of corrosion, distortion and fatigue of metal, and the like, which may make release devices of the frangible type inoperative. The invention will be fully understood from the following description, read in connection with the accompanying drawings in which Fig. 1 is a vertical section through a preferred form of the invention;

Fig. 2 is a vertical section through the frangible element of Fig. 1, and

Fig. 3 is a vertical section through a modified form in which a liquid is used for transmitting pressure.

In the drawings (Figs. 1 and 2), reference numeral 1 denotes a casting having an annular flange 2. A corresponding casting 3 has an annular flange 4. The flanges are secured together by bolts 5.

Within the casing 6 thus formed, there is provided a frangible element, which is preferably in the form of a hollow cylinder 7 threaded exteriorly at both ends. The cylinder is indented or cut away at an intermediate portion to form a weakened section 8. Above and below this section the cylinder 7 carries hexagonal flanges 9 and 10.

Casting 1 has a central aperture 11 defined by a rim 12. Flange 10 is seated in this rim in such manner as to prevent rotation of the flange. A flexibly mounted diaphragm or disc 13 has a central opening which fits over cylinder 7 and rests upon the upper side of flange 9. The outer margin of diaphragm 13 is clamped between flanges 2 and 4 so as to make a fluid-tight joint with them. A backing plate 14 rests upon the upper surface of disc 13. The plate has an annular raised portion 15 to which the diaphragm conforms, as at 15a.

The frangible element described above is held in place by a nut 16 screwed on the upper end of cylinder 7 within casing 6, and by a fitting 17 screwed on the lower end of that cylinder outside of casing 6. Gaskets 16a and 16b, arranged respectively beneath nut 16 and flange 10 make the mounting of cylinder 7 fluid-tight.

The container on which the release device is to be used is connected with it through a pipe 18 opening into casing 6. A manually operable valve 19 of any suitable type is installed in this pipe. Casing 6 is also connected with pipes 20 and 21. Pipe 20 is coupled with fitting 17 and pipe 21 with an opening in the upper casting 3. These pipes may join at 22 and communicate with a look-box, or other suitable indicating device 23.

The frangible cylinder is preferably made of steel. The extent to which the cylinder is weakened by cutting away at the section 8 is determined by the amount of pressure which the device is to withstand. It will be observed that the area of diaphragm 13 is very large compared with the cross-sectional area through section 8. Accordingly pressure exerted on the lower face of the diaphragm has a multiplied effect on the frangible element. Section 8 may therefore be made relatively thick and thereby resistant to failure through corrosion, but the section will nevertheless yield at the required pressure.

Diaphragm 13 is made of some strong, flexible material, preferably lead supported by a thin layer of copper. Other materials may be used, which will satisfy the essential requirements of strength sufficient to resist rupture at the margin and resilience or flexibility sufficient to permit deformation. The backing plate 14 is best made of steel. It should be heavy and cover as much of the diaphragm area as is practical.

The operation of the device is as follows:

When the pressure in the container, as transmitted through pipe 18, exceeds the value which the frangible element 7 is designed to withstand, that element is ruptured at section 8 by the upward pull or tension of the diaphragm 13. Pressure is thereupon relieved through the pipes 20 and 21, gas or liquid escaping through the ruptured section and the separated ends of cylinder 7. The indentation 15a of diaphragm 13 gives it enough flexibility to rise until nut 16 strikes against the upper part of casting 3. Corrugation or other irregular conformation may be used to give an equivalent effect.

The operator will detect the failure of the device by observing the look-box 23, or other suitable signal that may be supplied. Valve 19 will then be closed and the safety device placed in operative condition.

In the form of the invention shown in Fig. 3 a liquid such as glycerin, heavy petroleum oil, or the like is used to protect the frangible element from contact with corrosive gases or liquids. The structure of the safety device is the same as in Figs. 1 and 2. However, the pressure transmitting line 24 from the vessel to be protected is formed with a trap 25 in which liquid is retained. The device operates as previously described, the only difference being that the pressure is transmitted through the liquid contained in trap 25.

This arrangement is desirable when very corrosive substances are likely to come in contact with the frangible element. Other means of protecting the element may be adopted such as anti-corrosion paints and the like.

The foregoing description is illustrative only and various changes and alternative arrangements may be made within the scope of the appended claims, in which it is our intention to claim all novelty inherent in the invention as broadly as the prior art permits.

We claim:

1. A pressure release device, comprising a casing, a flexibly mounted diaphragm therein, a backing plate supporting the diaphragm, an elongated member having a weakened section connected to the diaphragm and plate, and means for transmitting pressure to the diaphragm.

2. Apparatus according to claim 1 in which the plate has surface irregularities to which the diaphragm conforms.

3. Apparatus according to claim 1 in which the member having a weakened section is a hollow cylinder indented circumferentially near its middle.

4. In a pressure release device a flexibly mounted support having a separate frangible element secured thereto and adapted to be ruptured by displacement of the support, said support comprising a plate having surface irregularities and a flexible diaphragm conforming to those irregularities.

5. Apparatus according to claim 4 in which the diaphragm is held marginally by the abutting surfaces of flange castings, so that the diaphragm forms a central partition within the castings, and a separate frangible element is mounted for movement with the diaphragm.

6. A pressure release device comprising a casing and an elongated member, having a weakened section, within the casing and secured thereto at one end, a flexibily mounted diaphragm secured in the casing, means connecting the other end of the elongated member with the diaphragm, means for admitting fluid under pressure into the casing, and means for venting said fluid when its pressure is sufficient to cause the rupture of the weakened section.

7. A pressure release device comprising a casing and an elongated hollow member, having a weakened section, within the casing and secured thereto at one end, a flexibly mounted diaphragm marginally secured in the casing, means connecting the other end of the elongated hollow member with the diaphragm, means for admitting fluid under pressure into the casing, a vent pipe connected to the casing and means for venting said fluid through the hollow member and the vent pipe, when the pressure of the fluid is sufficient to cause the rupture of the weakened section.

8. A pressure release device comprising a casing, an elongated hollow member therein having a weakened section, a flexible diaphragm mounted in the casing, means for securing the hollow member to the casing and to the diaphragm, inlet and outlet vent pipes in general alignment with the hollow member, means for admitting fluid under pressure into the casing whereby when the predetermined pressure is exceeded the pull on the diaphragm will cause the weakened section of the hollow member to rupture and permit the discharge of fluid through the vent pipes.

9. Apparatus according to claim 8 in which the diaphragm is marginally secured in the casing and is provided with a backing plate.

10. A pressure release device comprising a casing, a frangible rod therein rigidly connected at one end to the casing, a diaphragm mounted in the casing and connected to the other end of the frangible rod, means for transmitting fluid pressure to the diaphragm whereby the diaphragm is flexed away from the casing, and means for venting pressure when the rod breaks owing to the pull of the diaphragm.

11. Apparatus according to claim 10 in which the frangible rod is hollow and has two circumferential flanges between which the walls of a central opening of the diaphragm are engaged.

RICHARD W. TRYON.
GEORGE M. BOOTH.